US00RE47479E

(19) United States
(12) Reissued Patent
Rhodes et al.

(10) Patent Number: US RE47,479 E
(45) Date of Reissued Patent: Jul. 2, 2019

(54) EFFICIENTLY FINDING COLLABORATIONS ON A NETWORK

(71) Applicant: IMDb.com, Inc., Seattle, WA (US)

(72) Inventors: Christopher G. Rhodes, North Hollywood, CA (US); Paul K. Young, Sherman Oaks, CA (US); Thomas William Whitcomb, Sherman Oaks, CA (US)

(73) Assignee: IMDB.COM, INC., Seattle, WA (US)

(21) Appl. No.: 14/841,350

(22) Filed: Aug. 31, 2015

Related U.S. Patent Documents

Reissue of:
(64) Patent No.: 8,543,648
Issued: Sep. 24, 2013
Appl. No.: 12/966,926
Filed: Dec. 13, 2010

(51) Int. Cl.
*G06F 16/901* (2019.01)
*G06Q 50/00* (2012.01)

(52) U.S. Cl.
CPC ..... *G06F 16/9027* (2019.01); *G06Q 50/01* (2013.01)

(58) Field of Classification Search
CPC ..... G06F 17/30958; G06F 17/30961; G06Q 50/01
USPC ..... 709/205, 238; 707/797, 798
See application file for complete search history.

(56) References Cited

U.S. PATENT DOCUMENTS 6,529,498 B1 * 3/2003 Cheng ..... 370/351
7,512,612 B1 * 3/2009 Akella ..... G06F 17/30958
8,543,648 B1 9/2013 Rhodes
2003/0123397 A1 * 7/2003 Lee et al. ..... 370/256
2004/0073702 A1 * 4/2004 Rong ..... H04L 45/12 709/241
2004/0100956 A1 * 5/2004 Watanabe ..... 370/389
2005/0015378 A1 * 1/2005 Gammel et al. ..... 707/100
2005/0267940 A1 * 12/2005 Galbreath et al. ..... 709/206
2008/0288596 A1 * 11/2008 Smith ..... G06Q 30/02 709/206
2009/0177624 A1 * 7/2009 Ahlin ..... 707/3
2010/0138491 A1 * 6/2010 Churchill et al. ..... 709/204
2012/0005238 A1 * 1/2012 Jebara ..... G06Q 10/04 707/798

OTHER PUBLICATIONS

Non Final Office Action dated Aug. 3, 2012, received in U.S. Appl. No. 12/966,926.
Notice of Allowance dated Jun. 5, 2013, received in U.S. Appl. No. 12/966,926.

* cited by examiner

*Primary Examiner* — Eron J Sorrell
(74) *Attorney, Agent, or Firm* — Hogan Lovells US LLP

(57) ABSTRACT

Various embodiments enable finding collaborations in a network. One embodiment obtains collaboration data for a plurality of nodes, receives a request to locate at least one collaboration for a user, generates a search tree starting by determining a source node of the collaboration data, the search tree including at least two levels, and expanding the search tree until at least one target node is located that corresponds to a solution for the request, optimizes the search tree to attempt to reduce the number of solutions, generates an adjacency list of adjacent nodes in the optimized search tree, searches the adjacency list to locate at least one shortest path to the target node, and generates a list of collaboration data that is associated with the at least one shortest path from the source node to the target node.

21 Claims, 14 Drawing Sheets

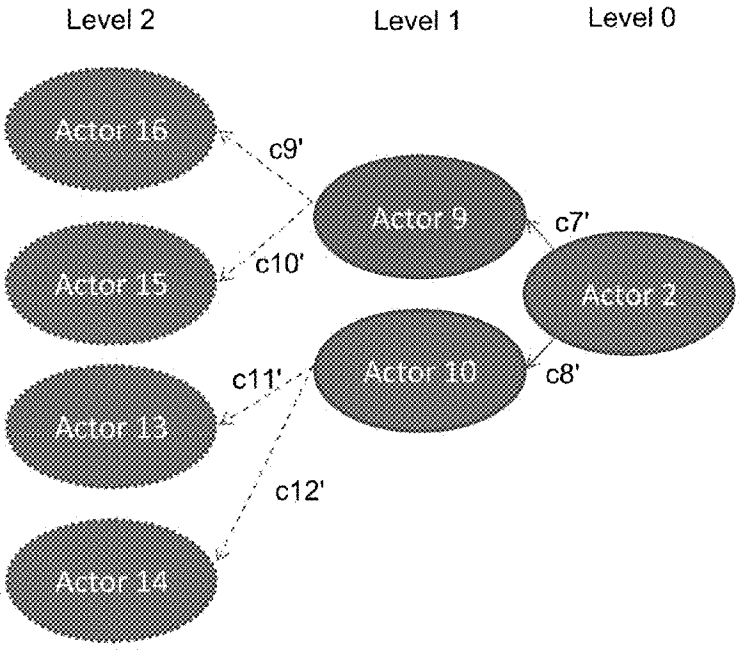
FIG. 9B
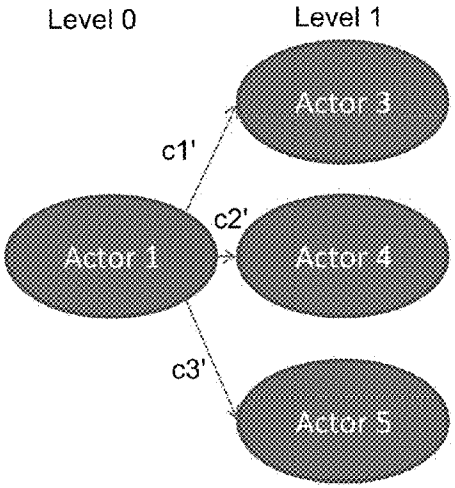

EFFICIENTLY FINDING COLLABORATIONS ON A NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Many websites on the internet allow users to join social or professional networks. A social network is, generally, an online platform that focuses on building or maintaining social relations among people, e.g., who share interests and/or activities. A social network typically contains a user profile for each of a number of users, with each user profile detailing that user's interests, experiences, and other information such as the individual's birthday, hometown, education, career, as well as photographs that the individual has uploaded. Certain networks focus on specific types of information. For example, a professional network service is a type of social network service that is focused mainly on interactions and relationships of a business nature, e.g., places of employment and links to co-workers or clients, rather than including personal, non-business interactions. Professional networking sites allow users to connect with former and current colleagues, as well as others such as classmates. However, these conventional networking sites have various shortcomings, such as the inability to effectively connect the appropriate individuals for new professional or other such opportunities.

BRIEF DESCRIPTION OF THE DRAWINGS

Various embodiments in accordance with the present disclosure will be described with reference to the drawings, in which:

FIG. 9A-9C depicts a search tree expansion according to various embodiments;

DETAILED DESCRIPTION

Figure 1:
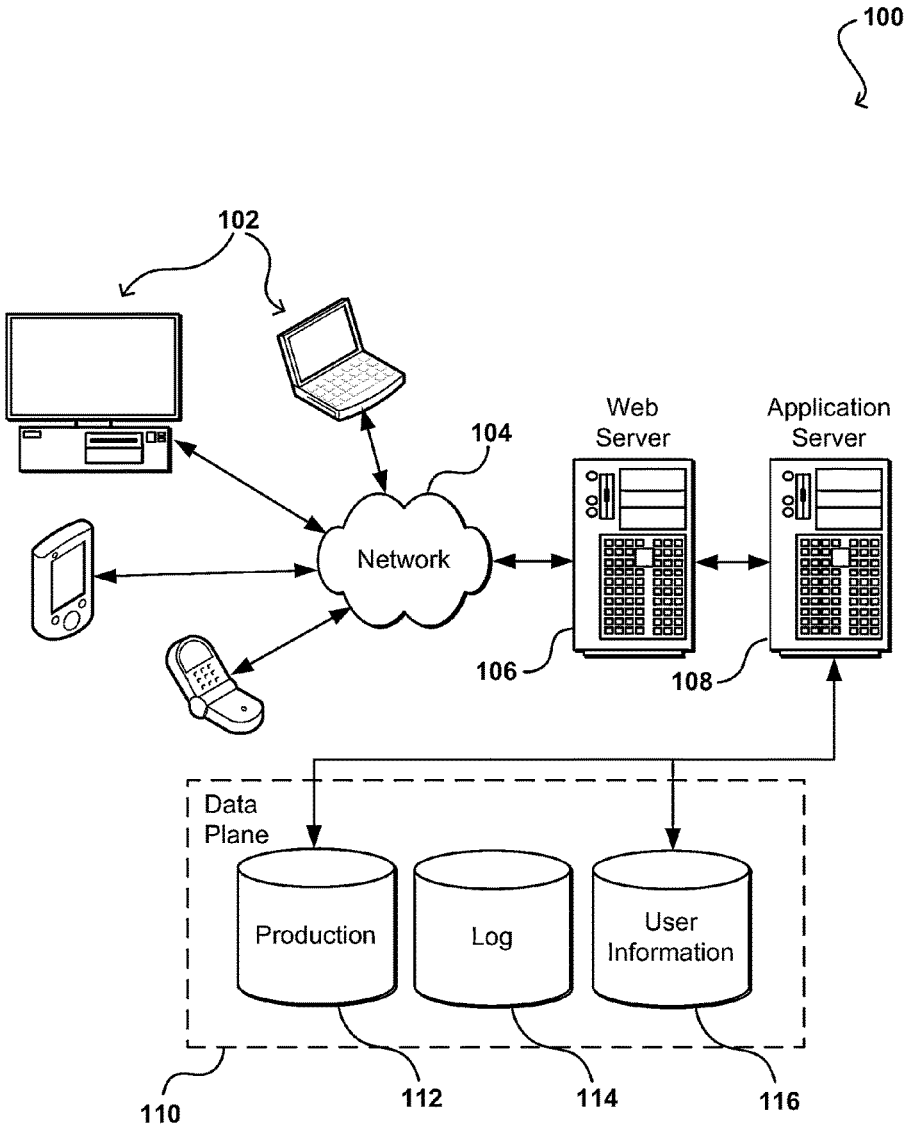
FIG. 1 illustrates an environment in which various embodiments can be implemented.

Systems and methods in accordance with various embodiments of the present disclosure may overcome one or more of the aforementioned and other deficiencies experienced in conventional approaches to networking between individuals and other entities. In particular, various embodiments provide systems, methods, and non-transitory computer-readable storage media for locating, determining, suggesting and/or maintaining collaborations in a network space. In one embodiment, collaboration data for a plurality of nodes is stored, where each node can correspond to an individual, such as an actor, or a group of individuals. The collaboration data can include actors, movies, television programs, directors, producers, theater productions that a set of actors have collaborated on or with in the past. In other embodiments, collaboration data may include professional affiliations, friends, companies, etc. When a search request is received from a user device, various embodiments perform a breadth search of the collaboration data to locate at least one target node starting from a source node. The search can be executed against a search tree that is generated or otherwise obtained starting with the source node, and having at least two levels. The search tree can be expanded until at least one solution to the breadth search is found. Once one or more solutions have been identified, the search tree is optimized or otherwise processed to reduce the number of solutions determined by the breadth search, and then in various embodiments an adjacency list of adjacent nodes in the optimized search tree is generated and stored. Various embodiments are able to search the adjacency list to locate at least one of a shortest path to the target node.

In another embodiment, a request from a user device for collaboration data is received. The collaboration data can be provided to the user device as a search result corresponding to a search query. In response to the request, various embodiments provide for display on the user device collaboration data, the collaboration data relating to at least one degree of separation between a source node and a target node in a search tree, and the correlation data being generated for presentation to the user device if the correlation data is one of the solutions for locating one of a shortest path from a source node to a target node in the search tree, the collaboration data being stored to a search index used to provide the search result.

Various embodiments can be utilized with any of a number of social and professional networks that can be accessed through the internet or another such electronic network. In some embodiments a user, such as an actor, may be able to find or have access to new creative projects by leveraging a professional network to see what connections he or she already has that may lead to new project or a prospective role. For example, if an actor wishes to audition for a role, according to some embodiments, he or she could request collaborative information for someone he or she has collaborated with in the past, and is currently able to assist the user in advancing his or her chances of being offered the role.

FIG. 1 illustrates an example of an environment 100 for implementing aspects in accordance with various embodiments. As will be appreciated, although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those discussed in detail below.

Figure 2:
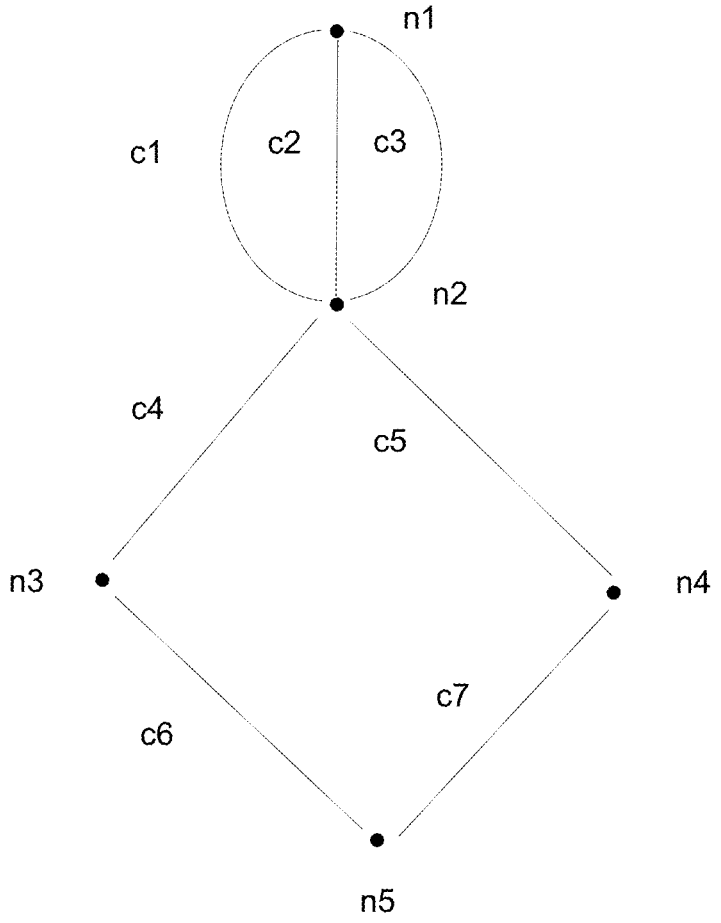
FIG. 2 is a collaboration graph that illustrates how people and collaborations are connected according to some embodiments.

Various systems and methods described herein can find collaborations using any of a number of criteria and/or approaches as discussed and suggested herein. In one embodiment, a request for collaboration data is received across a network 104 from a user device 102, where an application server 108 or other such component is operable to search collaboration data stored in the data plane 110 or another such location. The collaboration data can be stored in an appropriate repository, and represented by at least one collaboration graph generated based on at least one criterion of the request. An example collaboration graph is illustrated in FIG. 2, with the graph consisting of n1-n5 actors and collaborations c1-c7. A problem that can be solved using such a graph is determining one or more ways in which actor n1 is connected to actor n5 through various people n2, n3, n4 and/or collaborative efforts c1-c7. It should be understood that other graphs can include other information as well that can be used to link persons, items, or other such entities. In the particular example illustrated by FIG. 2, n1 is an actor and is the source node of the graph. One solution to the problem can be found by determining the shortest path (e.g., smallest number of nodes along a path) from actor n1 to actor n5, where n5 in this example is the target node. According to an embodiment, a system can determine all the shortest collaboration paths between each actor (n1-n5).

In this particular example, actor n1 has collaborated with actor n2 on three different projects c1, c2, and c3. Actor n2 has collaborated on one project each (represented by c4 and c5) with the actors represented by nodes n3 and n4. Actors n3 and n4 have worked with the actor n5 (i.e., the target node n5), on one project each represented by collaborations c6 and c7. Thus, with the graph illustrated in FIG. 2, there are six different paths or solutions connecting source actor n1 through the network to target actor n5. These path solutions are further detailed below in Table 1.

TABLE 1

Solutions to the 6 paths from n1 to n5 in FIG. 2.

| Path | Solutions |
|---|---|
| 1 | n1, c1, n2, c4, n3, c6, n5 |
| 2 | n1, c2, n2, c4, n3, c6, n5 |
| 3 | n1, c3, n2, c4, n3, c6, n5 |
| 4 | n1, c1, n2, c5, n4, c7, n5 |
| 5 | n1, c2, n2, c5, n4, c7, n5 |
| 6 | n1, c3, n2, c5, n4, c7, n5 |

Figures 3A, 3B, 3C, 3D:
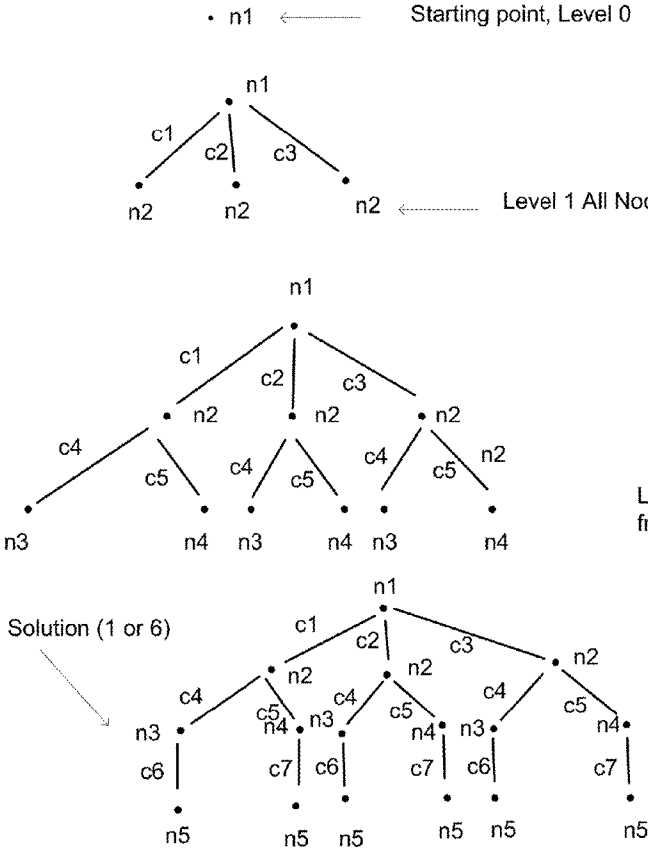
FIG. 3A-3D depicts an expanding search tree according to various embodiments.

A straightforward approach to finding the above solutions is to apply a breadth-first search from a source node to a target node, while saving the path history along the way that includes the source node n1 and the target node n5, an example of which can be seen in FIG. 3D. In graph theory, a breadth-first search is conducted by the system using a graph search algorithm that begins with the source node and explores all the neighboring nodes. For each of the nearest nodes, the system explores the unexplored neighbor nodes, and so on, until it finds the target node, while constructing a search tree. FIGS. 3A-3D depict the generation of an unoptimized search tree that includes all of the solutions paths from n1 to n5 illustrated in FIG. 2. As seen in FIG. 3A, the system starts creating the unoptimized search tree with n1, which can be considered level 0. In FIG. 3B, the search tree is expanded out to level 1, which includes all the nodes (n2), which are directly adjacent to n1. In a more descriptive example, n1 can be considered an actor, and n2 can be considered all the actors that n1 has directly collaborated with, for instance, acting in a movie together. In this particular case, n1 has only collaborated with one actor n2, but on three different projects c1, c2, and c3. Since the target node n5 was not found at level 1, the search tree is expanded to level 2 in FIG. 3C, which includes all nodes (n3 and n4) that are two degrees of separation from the source node n1. Relating back to the example used in FIG. 3B, n3 and n4 are actors that have directly collaborated with actor n2, but not with n1. Again since the target node n5 was not found by the system at level 2, the search tree is expanded to level 3, where the target node n5 was found by the system. There are six different paths (i.e., solutions) to that lead from the source node n1 to the target node n5, as also seen in FIG. 3D. The six different path solutions to of the search tree can also be seen in Table 1 above.

Figure 4:
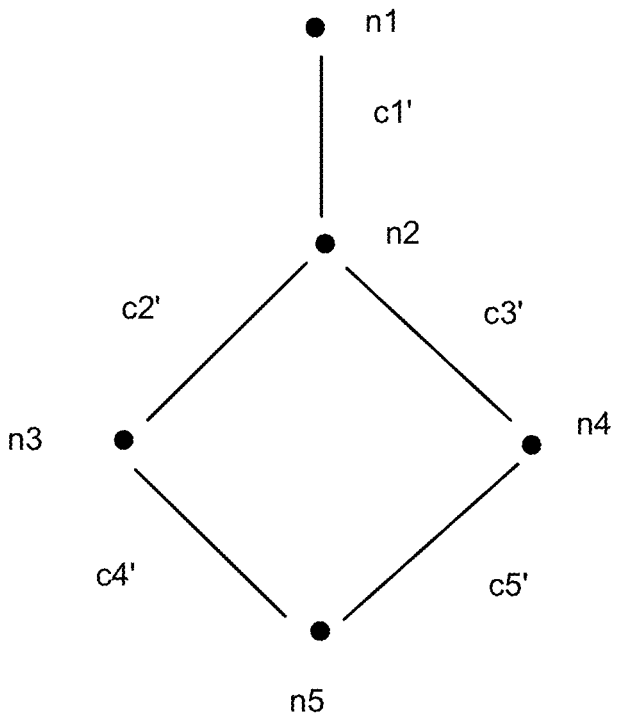
FIG. 4 depicts a condensed search tree according to various embodiments.
Figure 5:
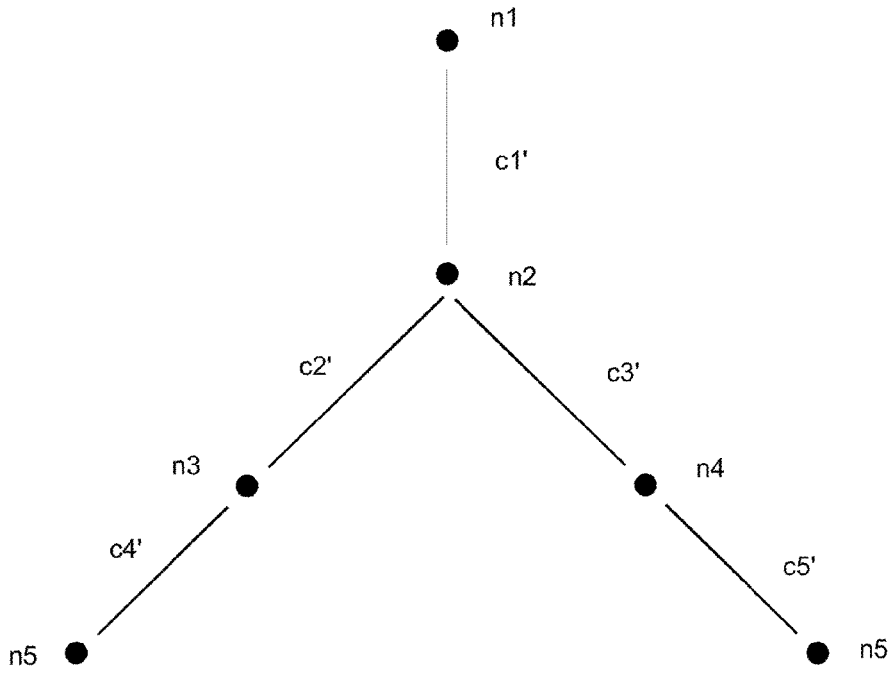
FIG. 5 illustrates an optimized search tree according to some embodiments.

FIG. 4 is a representative graph of a first optimization the system can perform on the graph illustrated in FIG. 2. As seen in FIG. 4, multiple edges between any two nodes are represented with a single "representative" edge that condenses the data related to the graph. For example, edges c1, c2, and c3 shown in FIG. 2 are condensed to representative edge c1' in FIG. 4. In this optimized example, the solutions to the collaboration paths from the source node n1 to the target node n5 are reduced from six to two representative solution paths, as seen in Table 2 below. This reduction in the occurs because the three collaboration edges c1, c2, and c3 between nodes n1 and n2 depicted in FIG. 2, can be condensed down to one path c1' (seen in FIG. 4), which will yield only two representative solution paths rather than six, in this particular example. Since there is only one respective collaboration path between nodes n2 and n3, and on path between n2 and n4 these collaboration paths do not need to be condensed. Similarly, the respective collaboration path between n3 and n5, as well as n4 and n5 will not need to be condensed. The data in the representative solutions can be then configured into an optimized search tree, which is illustrated in FIG. 5.

TABLE 2

Representative solutions to the path between n1 and n5 of the optimized graph of FIG. 4

| Path | Representative Solutions |
|---|---|
| 1 | n1, c1', n2, c2', n3, c4', n5 |
| 2 | n1, c1', n2, c3', n4, c5', n5 |

The data represented in the collaborations c' in the optimized search tree seen in FIG. 5 can be expanded out by the system, but only if they are part of a solution path from the source node to the target node. Also, this expansion step can optionally be performed as a post processing step that can be stored on a disc or a relational database, since the amount of data to process is small relative to the graph data that can reside in the system's memory for more rapid processing. The expansion of n1, c', n2 from FIG. 5 can be seen below in Table 3. Using the representative graph depicted in FIG. 5 allows the data stored in the graph to have a greatly reduced memory foot print. Moreover, the results that the system has to search in the graph is smaller, and thus can be searched by the system more efficiently. For example, the graph seen in FIG. 5 can be represented with the simple adjacency list seen below in Table 4. If the system does not include the first optimization as described above, the solution would be much longer, and increase the amount of memory that the system needs to find the path solutions to the graph. The optimized graph can be searched more efficiently by the system. A non-optimized of adjacent nodes and their respective collaborations set might look like the solutions seen in Table 5.

TABLE 3

Solutions to the expansion of n1, c', n2 as seen in FIG. 5.

| | Expansion Solutions |
|---|---|
| 1 | n1, c1, n2 |
| 2 | n1, c2, n2 |
| 3 | n1, c3, n2 |

TABLE 4

Adjacency List from the optimized graph seen in FIG. 4.

| Node | Adjacency List | |
|---|---|---|
| n1 | n2 | |
| n2 | n1 | |
| n3 | n2 | n5 |
| n4 | n2 | n5 |
| n5 | n3 | n4 |

TABLE 5

Non-optimized list of adjacent nodes including their collaborations seen in non-optimized graph seen in FIG. 2.

| Node | Non-Optimized Adjacency List | | |
|---|---|---|---|
| n1 | n2, c1 | n2, c2 | n2, c3 |
| n2 | n1, c1 | n1, c2 | n1, c3 |
| n3 | n2, c4 | n5, c6 | |
| n4 | n2, c5 | n5, c7 | |
| n5 | n3, c6 | n4, c7 | |

The system is able to perform a second optimization of the data by terminating the breadth-first search as soon as the first occurrence of the target node is found. In an example search tree seen in FIG. 6 where the collaboration paths between the actors Pauly Shore and Fred Astaire, and the collaborations are films and television shows, go from the source node n1 (i.e., Pauly Shore) at level 0, to two thousand nodes, which represent actors that have worked with Pauly Shore, on level 1. There are three hundred thousand nodes at level 2, each node at level 2 representing an actor that has directly worked with an actor from level 1, and 1.5 million nodes at level 3, each node representing an actor that has worked with an actor from level 2. Multiple occurrences of the same node can occur at a specific level if an actor has collaborated with an actor on the previous level on more than one project, or if the actor has worked with more than one of the actors on the previous level. In one embodiment, each level of the search tree is built from left to right. In this case, using the example tree shown in FIG. 6, if the first node n4 on level 3 is Fred Astaire, which is the target node in this example, the system can terminate building the search tree at this point and does not need to build the remaining 499,999 nodes on level 3. A search tree may be built in other manners.

Figure 6:
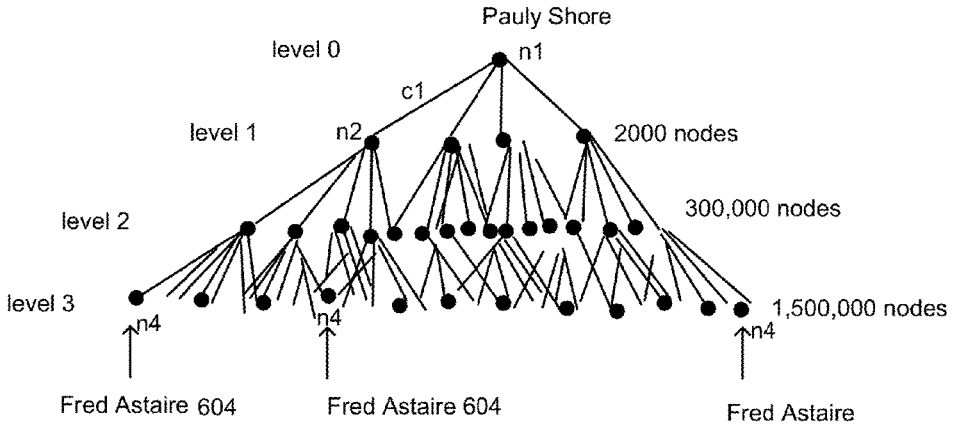
FIG. 6 depicts a specific search tree according to some embodiments.

Using the example search tree shown in FIG. 6, the first occurrence of the target node n4 (i.e., Fred Astaire) was identified on level 3 of the tree, which is three degrees separated (i.e., from level 0 to level 3) from the source node n1 (i.e., Pauly Shore). Thus, any other shortest paths that would lead to Fred Astaire will involve people (i.e., nodes) that have collaborated with Fred Astaire and are two degrees of separation from Pauly Shore. As a result, the system recursively considers people (i.e., nodes) on the prior level of the tree (level 2 using the example shown in FIG. 6) that have collaborated with Fred Astaire. In other words, instead of considering all 1.5 million people on level 3, the system only needs to consider people (i.e., nodes) on level 3 that worked with Fred Astaire, then recursively consider people on level 2 that worked with the people selected from level 2. This is because the system now knows how many degrees separated Pauly Shore is from Fred Astaire, and all of the shortest path solutions will include actors that are directly adjacent to Fred Astaire on level 2. The system now has to merely search the adjacency list for all of the actors on level 2 that are directly adjacent to Fred Astaire. Then, knowing which actors on level 2 are part of the solution path, the system searches the adjacency list for all of the actors on level 1 that are directly adjacent to the actors on level 2 that are part of the solution path. It should be understood, however, that other systems might not limit to the shortest path in all cases, and can consider relationships or nodes at other levels within the scope of various embodiments.

Figure 7:
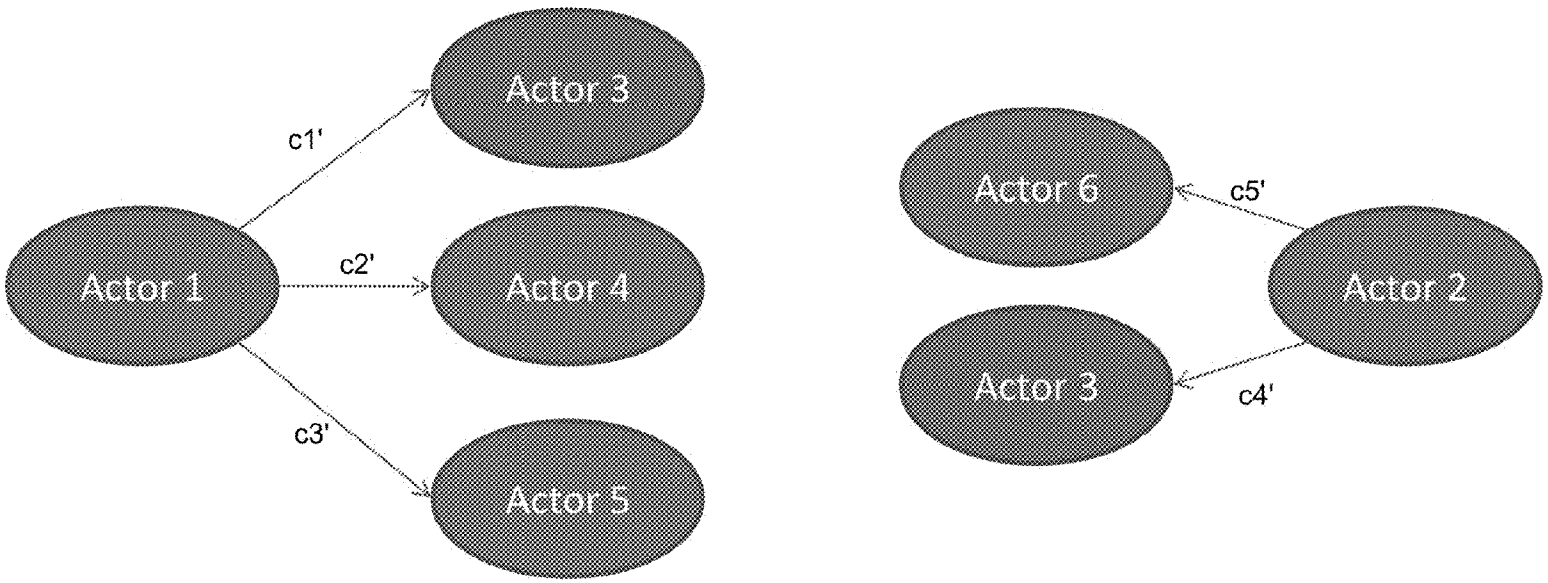
FIG. 7. illustrates a search tree expansion according to some embodiments.

FIG. 7 illustrates an embodiment of determining the shortest path solutions using the intersection of the representative paths from the source node and the target node. In various embodiments, a first optimized search tree can be generated starting with the source node and a second optimized search tree starting with the target node can be generated, and using the intersection of the two search trees the system is able to determine the representative path solutions between the source node and the target node. As seen in FIG. 7, the first search tree is generated starting with Actor 1 and branches out to Actor 3, Actor 4, and Actor 5, with paths c1', c2', and c3' being the representative collaborations with Actor 1. Then the system can begin generating the second optimized search tree with Actor 2, which is the target node. Actor 2 has collaborated with Actor 3 and Actor 6. The representative paths between the two actors on level 1 of the target node optimized search tree are c4' and c5', respectively. At this point, the system identifies if the same actor is present in the optimized search tree. In the particular example seen in FIG. 7, Actor 3 is the common link between the two optimized search trees. Knowing this information the system is able to determine that the representative solution path in this example, which is seen below in Table 6.

TABLE 6

Representative solution path for the example seen in FIG. 7.

| Path | Representative Solution |
|---|---|
| 1 | Actor 1, c1', Actor 3, c4', Actor 2 |

At this point the system can perform a post processing step to expand out representative collaborations c1' and c4' if multiple collaborations exist between Actor 1 and Actor 3, or Actor 3 and Actor 2. The system is then able to determine all the shortest collaboration paths between Actor 1 and Actor 2.

Figure 8A:
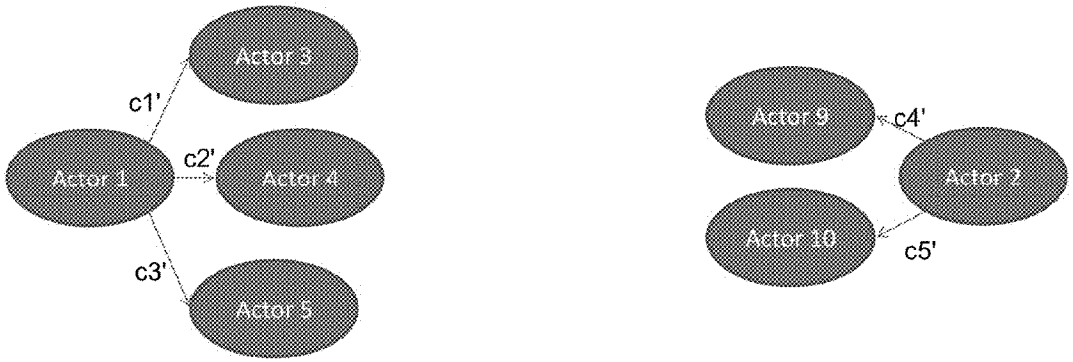
FIG. 8A-8B illustrates a search tree expansion according to various embodiments.
Figure 8B:
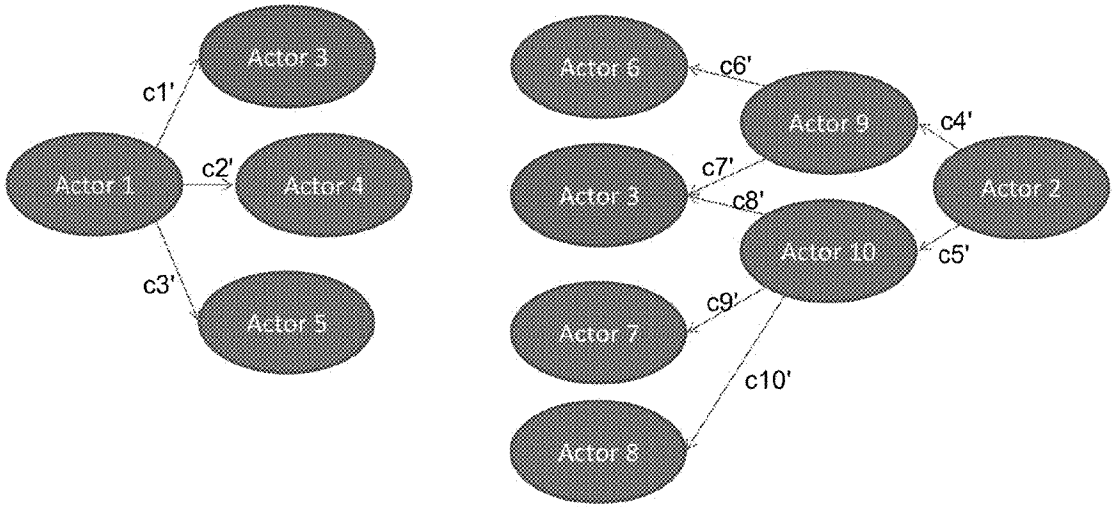

FIGS. 8A and 8B illustrate a similar embodiment as that depicted in FIG. 7, but with a more complex search tree. In FIG. 8A a first optimized search tree begins being constructed starting with source node Actor 1. Level 1 of the first optimized search tree includes Actor 3, Actor 4, and Actor 5. Then the second optimized search tree can begin being generated. Level 1 of the second optimized search tree includes Actor 9 and Actor 10. The system is will identify if the same actor is present in level 1 of both the first and second optimized search trees. Since there is not, the system builds the next level of the search tree with the fewest number of nodes at level 1, which will enable the system to determine the solution paths the most quickly. As seen in FIG. 8B, level 1 of the second optimized search tree has the fewest number of nodes (i.e., Actor 9 and Actor 10), so level 2 of the second optimized search tree is generated. Level 2 includes Actor 3 and Actor 6 which have each collaborated with Actor 9, and Actor 3, Actor 7, and Actor 8 who have collaborated with Actor 10. Again the system now identifies if the same node is present in level 1 of the first optimized search tree and level 2 of the second optimized search tree, and in this example Actor 3 is identified as the overlapping node in both search trees. Thus, the system can determine that there are two representative solution paths from Actor 1 to Actor 2, which can be seen below in Table 7.

TABLE 7

Representative solution paths for the example seen in FIG. 8B.

| Path | Representative Solutions |
|---|---|
| 1 | Actor 1, c1', Actor 3, c7', Actor 9, c4', Actor 2 |
| 2 | Actor 1, c1', Actor 3, c8', Actor 10, c5', Actor 2 |

As a post-processing step, the system is able to expand out the representative collaborations c1', c4', c5', c7', and c8', if any of the representative paths include more than one collaboration, to find all of the shortest solution paths from Actor 1 to Actor 2.

Figure 9A:
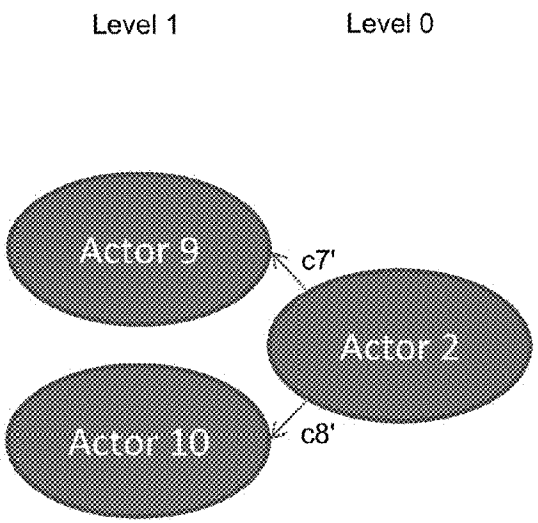
Figure 9A:
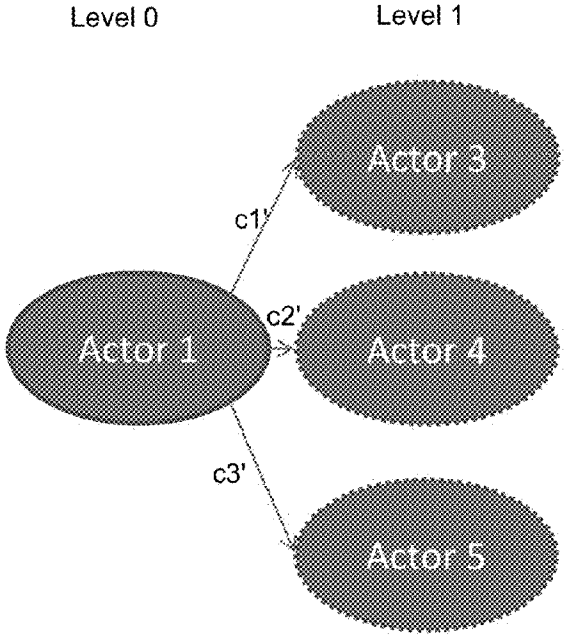
Figure 9C:
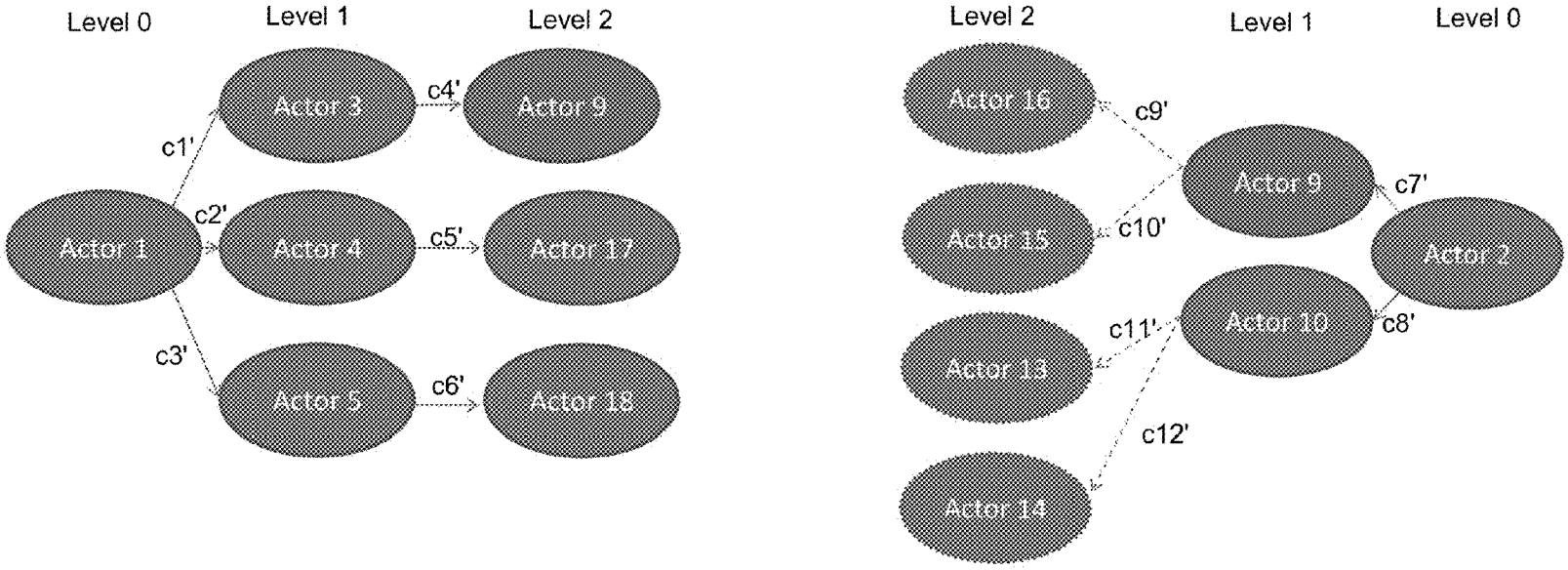

Various embodiments also include building a first optimized search tree starting with the source node and a second optimized source tree starting with the target node, to determine the shortest representative path solutions using the intersection of the two search trees, whereby prior to generating a subsequent level of either search tree, the system determines the number of nodes in each subsequent level in both search trees and only builds the subsequent level with the fewest nodes, as illustrated in the example seen in FIGS. 9A-9C. In FIG. 9A, the system begins building the first search tree with Actor 1, which is the source node, at Level 0. Target node, Actor 2, is used as the starting point for building the second search tree at Level 0. At this point, the system can look ahead to Level 1 in both the first and second search trees to determine which search tree has the fewest nodes at Level 1, and only generates Level 1 in that search tree. In the example illustrated in FIG. 9A, Level 1 in the second search tree has only two nodes (i.e., Actor 9 and Actor 10), while Level 1 has three nodes (i.e., Actor 3, Actor 4, and Actor 5). The system can now check to see if a common node exists between the two search trees, and in FIG. 9A a common node has not been found. The system now determines the subsequent level in both search trees with the fewest nodes by looking at Level 1 in the first search tree, and Level 2 in the second search tree. As seen in FIG. 9B, Level 1 in the first search tree has three nodes (i.e., Actor 3, Actor 4, and Actor 5), as opposed to four nodes (i.e., Actor 13, Actor 14, Actor 15, and Actor 16) in Level 2 of the second search tree, the system builds Level 1 in the first search tree. Again, the system determines that a common node between both search trees has still not been found, and the system looks to build the Level 2 (which happens to be the subsequent level to be generated in both search trees) with the fewest nodes. In FIG. 9C it can be seen that Level 1 has three nodes (i.e., Actor 9, Actor 17, and Actor 18) and Level 2 from the second search tree has the four nodes previously mentioned. Thus, the system will build Level 2 in the first search tree. At this point the system finds that the intersection between the two optimized search trees is at Actor 9. The shortest representative path from Actor 1 to Actor 2 can then be determined by the system, which is seen below in Table 8.

TABLE 7

Representative solution paths for the example seen in FIG. 9C.

| Path | Representative Solution |
|---|---|
| 1 | Actor 1, c1', Actor 3, c4', Actor 9, c7', Actor 2 |

Figure 10:
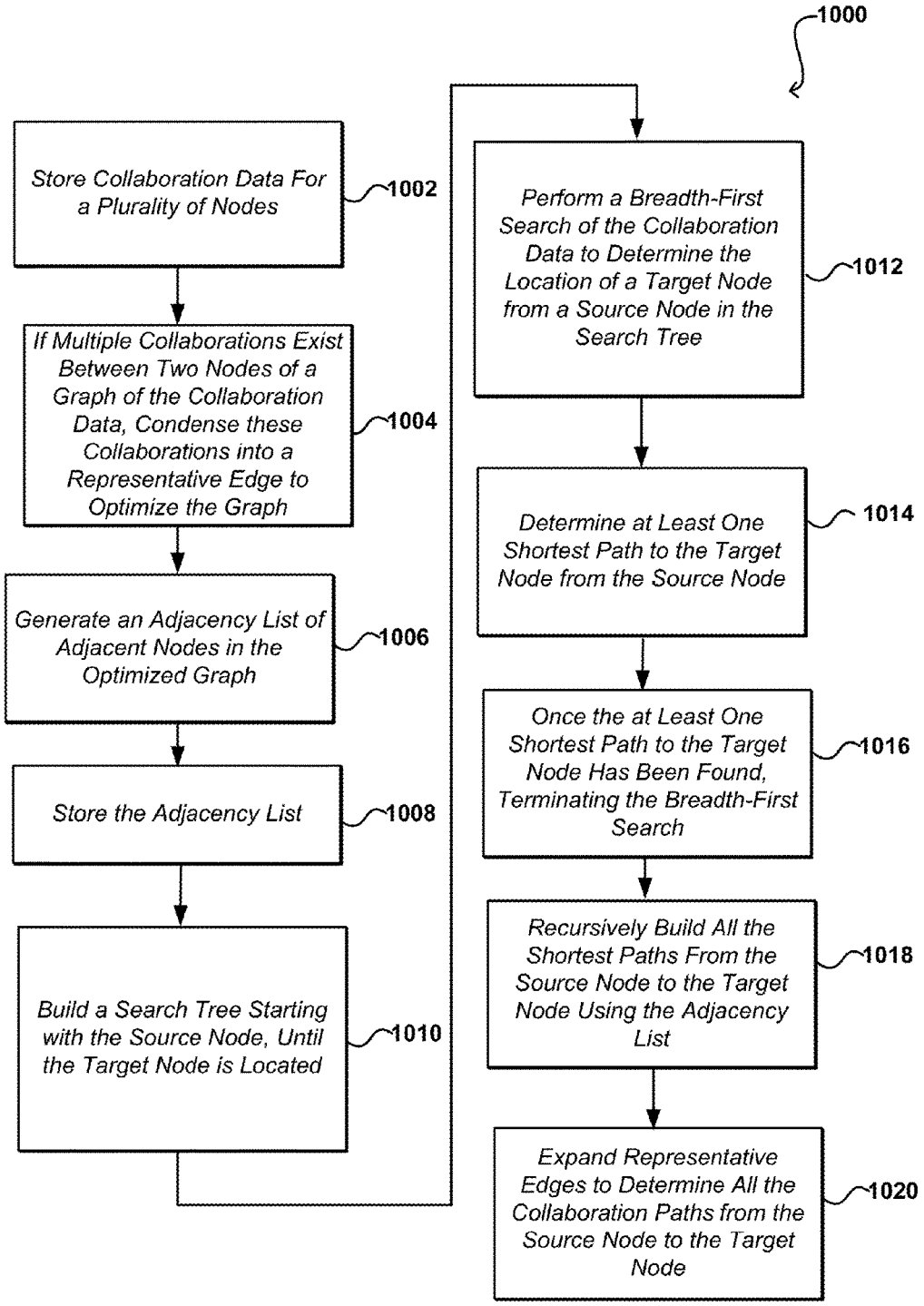
FIG. 10 is a flow diagram for a method for finding collaborations in a network in accordance with some embodiments.

FIG. 10 is a flow diagram showing the method 1000 performed in accordance with one embodiment for finding collaborations in a network. In step 1002, collaboration data for a plurality of nodes is stored. Again, a node can correspond to an individual, such as an actor, in the example seen in FIG. 6 the source node n1 being Pauly Shore, who has directly collaborated with an actor represented by node n2 in a project represented by c1. Next in step 1004, if multiple collaborations exist between any two nodes in a graph of the collaboration data, these multiple collaborations are condensed down to one representative collaboration, such as c1' seen in FIG. 4. Then, using the data in the optimized graph generated by condensing any multiple edges between two nodes, an adjacency list is generated of all the adjacent nodes in the optimized graph in step 1006, which is stored in step 1008. An adjacency list can look like the example seen above in Table 4. Using the information in the adjacency list, a search tree is built by the system starting with the source node, until the target node is found in step 1010. Relating this step back to FIG. 6 (assuming that all the collaboration edges in FIG. 6 are representative edges), the system starts building the search tree with Pauly Shore as the source node n1, and then includes all the actors that Pauly Shore has directly worked with, which are depicted by the nodes in level 2. This process continues until the target node n4, Fred Astaire, is located. Once the target node n4 is located in FIG. 6 then the system stops building the search tree. In step 1012, a breadth-first search is performed of the optimized search tree to determine the location of the target node in relation to the source node, until at least one of the shortest paths to the target node from the source node has been determined. After which, the breadth-first search is terminated in step 1018. Then using the information in the adjacency list, all the shortest paths from the target node to the source node are then recursively built. Knowing the level of the source node, the system is able to only search the adjacency list of all the actors on the previous level to determine which have collaborated with Fred Astaire, and this information is used to construct all the shortest path solutions. Then as a post-processing step the system is able expand an representative collaboration edges to determine all of the shortest paths from the source node to the target node in step 1020.

Figure 11:
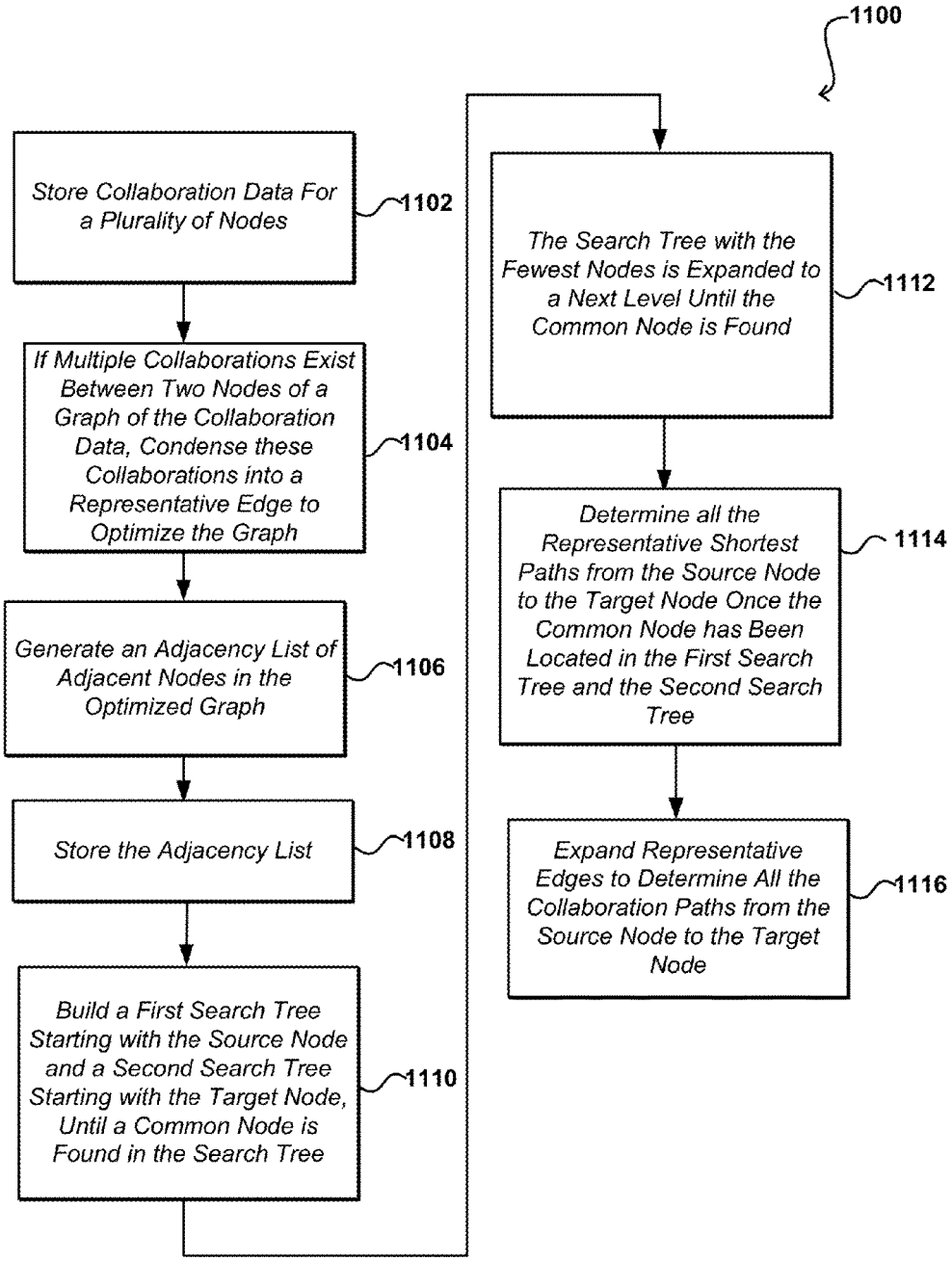
FIG. 11 is a flow diagram for a method for finding collaborations in a network in accordance with various embodiments.

FIG. 11 is a flow diagram depicting the method performed in accordance with another embodiment for finding collaborations in a network 1100. In step 1102, collaboration data for a plurality of nodes is stored. As seen in the example depicted by FIGS. 8A and 8B, the source node is Actor 1, who has directly collaborated with Actor 3, Actor 4, and Actor 5, and the target node is Actor 2 who has collaborated with Actor 9 and Actor 10. In step 1104, multiple collaborations between any two nodes in a graph of the collaboration data are condensed into a representative edge, which optimizes the graph. A list of all the adjacent nodes in the optimized graph, similar to the ones seen in Table 4 above, is generated in step 1106, and stored by the system in step 1108. Then, a first search tree starting with the source node and a second search tree starting with the target node are generated in step 1110. The building of first and second search trees in this manner can be seen in FIGS. 8A and 8B. Once the level of nodes that have directly collaborated with the source node and the target node have been generated in their respective search trees, the system identifies if a common node is located in both search trees. If there is not a common node, as in FIG. 8A, then the system generates the next level of the search tree with the fewest nodes in step 1112. In FIG. 8A this is the search tree starting with Actor 2. Once a common node is located in both the first and second search trees, which is Actor 3 in the example seen in FIGS. 8A-8B, the system determines all the shortest solution paths from the source node to the target node in step 1114. The shortest solution paths from Actor 1 to Actor 2 in the example illustrated by FIGS. 8A-8B, are listed in Table 7. Then, in step 1116, any representative edges between two nodes is expanded out to determine all the shortest solution paths from the source node and the target node, which can be performed as a post-processing step if desired.

Figure 12:
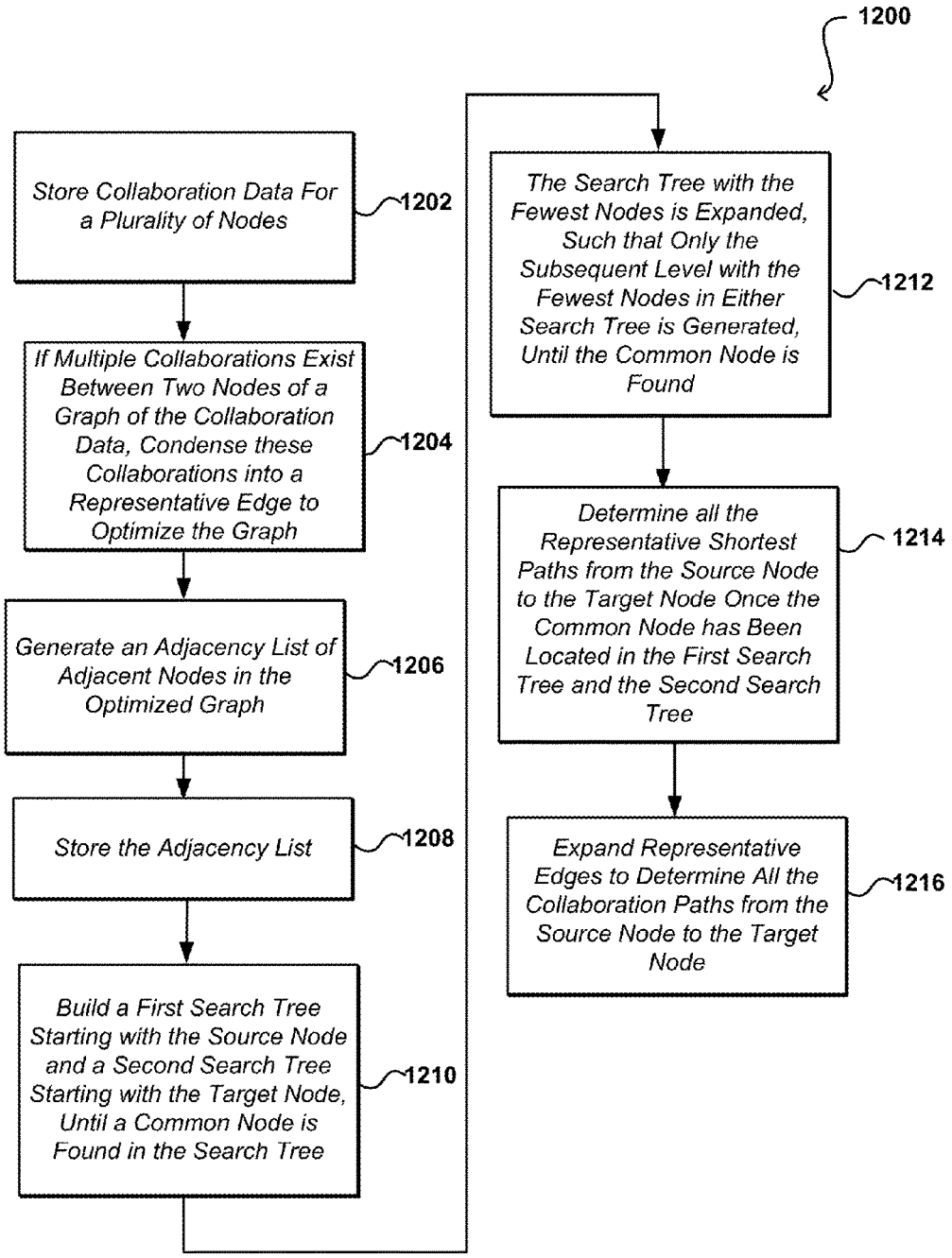
FIG. 12 is a flow diagram for a method for finding collaborations in a network in accordance with some embodiments.

FIG. 12 is a flow diagram depicting the method performed in accordance with another embodiment for finding collaborations in a network 1200. In step 1202, collaboration data for a plurality of nodes is stored. In step 1204, multiple collaborations between any two nodes in a graph of the collaboration data are condensed into a representative edge, which optimizes the graph. A list of all the adjacent nodes in the optimized graph, similar to the ones seen in Table 4 above, is generated in step 1206, and stored by the system in step 1208. Then, a first search tree starting with the source node and a second search tree starting with the target node are generated in step 1210. Next the system looks to the subsequent level in both search trees, and only generates the subsequent level with the fewest nodes. This process continues in step 1212 until the system finds a common node in both search trees. In FIGS. 9A-9C an example of how step 1212 could proceed is presented. FIG. 9A depicts that Level 1 in the second search tree has the fewest nodes, and thus is the subsequent level that is generated. Then in FIG. 9B, since a common node was not found in FIG. 9A, Level 1 of the first search tree is generated since it has fewer nodes than the subsequent level in the second search tree, which would be Level 2. In FIG. 9C, Level 2 in the first search tree is generated since it is the subsequent level with the fewest nodes, and here the systems finds that Actor 9 is a common node (i.e., intersection) between the two search trees. The shortest path solution can now be determined in step 1214. In the example depicted in FIGS. 9A-9C, this is the shortest path from Actor 1 to Actor 2 would be Actor 1, c1', Actor 3, c4', Actor 9, c7', Actor 2. Then, in step 1216, any representative edges between two nodes is expanded out to determine all the shortest solution paths from the source node and the target node, which can be performed as a post-processing step if desired.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for finding collaborations in a network, comprising:

under control of one or more computer systems configured with executable instructions, obtaining first collaboration data for a plurality of nodes;

receiving a request to locate at least one collaboration from a user;

optimizing a graph of the collaboration data by condensing multiple paths from a [set of the] *first* graph [nodes] *node* at a first level of the graph to a [same] *second* graph node at a second level of the graph to a single path [to the same graph node];

generating an adjacency list of adjacent nodes in the graph;

generating a search tree starting by determining a source node of the collaboration data, the search tree including at least two levels, and expanding the search tree until at least one target node is located that corresponds to a solution for the request;

searching the adjacency list to locate at least one shortest path from the source node to the target node;

*determining that the at least one shortest path includes the single path;*

*expanding the single path to the multiple paths;* and generating second collaboration data that is associated with the at least one shortest path [from the source node to the target node].

2. The computer-implemented method of claim 1, further comprising:

providing the second collaboration data that is associated with the at least one shortest path to the user.

3. The computer-implemented method of claim 1, wherein each of the first collaboration data and the second collaboration data includes information associated with at least one of a movie, a television show, a director, an actor, a producer, a company, a theater production, and a contact.

4. The computer-implemented method of claim 1, wherein the source node corresponds to a first individual, and the target node corresponds to a second individual.

5. The computer-implemented method of claim 1, wherein each of the first collaboration data and the second collaboration data includes at least one of a job title and a school.

6. The computer-implemented method of claim 1, wherein the source node includes an actor, and the target node includes an actor.

7. A computer-implemented method for finding a collaboration in a network, comprising:

under control of one or more computer systems configured with executable instructions, receiving a request for collaboration information for an individual;

in response to the request, analyzing collaboration data to determine relationships between a source node corresponding to the individual and at least one target node in a search tree, the search tree optimized by condensing multiple paths from a [set of nodes] *first node* at a first level to a [same] *second* node at a second level to a single path [to the same node]; [and providing the collaboration information for at least one collaboration when the at least one collaboration is] *determining* a solution for [locating one] *a* shortest path from the source node to the at least one target node in the search tree*;*

*determining that the shortest path includes the single path;*

*expanding the single path to the multiple paths; and*

*providing the collaboration information including the shortest path.*

8. The computer-implemented method of claim 7, further comprising:

generating the search tree starting by determining the source node of the collaboration data, the search tree including at least two levels, and expanding the search tree until the at least one target node is located that corresponds to the solution for the request.

9. The computer-implemented method of claim 7, further comprising:

generating an adjacency list of adjacent nodes in the search tree;

searching the adjacency list to locate the at least one shortest path from the source node to the target node; and generating second collaboration data that is associated with the at least one shortest path from the source node to the target node.

10. The computer-implemented method of claim 7, wherein the collaboration data includes information associated with at least one of a movie, a television show, a director, an actor, a producer, a company, a theater production, and a contact.

11. The computer-implemented method of claim 7, wherein the source node includes a first individual, and the target node includes a second individual.

12. The computer implemented method of claim 7, wherein the collaboration data includes at least one of a job title and a school.

13. A computer-implemented method for finding collaborations in a network, comprising:

under control of one or more computer systems configured with executable instructions, obtaining collaboration data for a plurality of nodes;

receiving a request to locate at least one collaboration from a user;

generating a first search tree starting with a source node, the first search tree including at least two levels and optimized by condensing first multiple paths from a first [set of nodes] *node* at a first level of the first search tree to a [first same graph] *second* node at a second level of the first search tree to a first single path [to the first same graph node]; [and]

generating a second search tree starting with a target node, the second search tree including at least two levels and optimized by condensing second multiple paths from a [second set of nodes] *third node* at a [third] *first* level of the second search tree to a [second same graph] *fourth* node at a [fourth] *second* level of the second search tree to a second single path [to the second same graph node,]*;*

[wherein] *generating* an additional level of [each of] the first search tree [and] *or* the second search tree [is generated] until a common node is found in both the first search tree and the second search tree, [and]

wherein *for each additional level,* one of the first search tree and the second search tree [having the fewest number of nodes at a current level generates] *is selected to generate* the additional level until the common node is found*;*

*determining that the shortest path includes the first single path;*

*expanding the first single path to the multiple paths; and*

*providing collaboration data including the condensed first multiple paths and the condensed second multiple paths*.

14. A system for finding collaborations in a network, comprising:

a processor; and a memory device including instructions that, when executed by the processor, cause the system to:

obtain first collaboration data for a plurality of nodes;

receive a request to locate at least one collaboration from a user;

optimize a graph of the collaboration data by condensing multiple paths from a [set of the] *first* graph [nodes] *node* at a first level of the graph to a [same] *second* graph node at a second level of the graph to a single path [to the same graph node];

generate an adjacency list of adjacent nodes in the optimized graph;

generate a search tree starting by determining a source node of the collaboration data, the search tree including at least two levels, and expanding the search tree until at least one target node is located that corresponds to a solution for the request;

search the adjacency list to locate at least one shortest path from the source node to the target node;

*determining that the at least one shortest path includes the single path;*

*expanding the single path to the multiple paths;* and generate second collaboration data that is associated with the at least one shortest path [from the source node to the target node].

15. The system of claim 14, wherein the collaboration data includes information associated with at least one of a movie, a television show, a director, an actor, a producer, a company, a theater production, and a contact.

16. The system of claim 14, wherein the source node includes a first individual, and the target node includes a second individual.

17. The system of claim 14, wherein the collaboration data includes at least one of a job title and a school.

18. A non-transitory computer-readable storage medium including instructions when executed by at least one processor causing the processor to:

obtain first collaboration data for a plurality of nodes;

receive a request to locate at least one collaboration from a user;

optimize a graph of the collaboration data by condensing multiple paths from a [set of the] *first* graph [nodes] *node* at a first level of the graph to a [same] *second* graph node at a second level of the graph to a single path [to the same graph node];

generate an adjacency list of adjacent nodes in the graph;

generate a search tree starting by determining a source node of the collaboration data, the search tree including at least two levels, and expanding the search tree until at least one target node is located that corresponds to a solution for the request;

search the adjacency list to locate at least one shortest path to the target node;

*determining that the shortest path includes the single path;*

*expanding the single path to the multiple paths;* and generate a list of collaboration data that is associated with the at least one shortest path [from the source node to the target node].

19. The non-transitory computer-readable storage medium of claim 18, wherein the collaboration data includes information associated with at least one of a movie, a television show, a director, an actor, a producer, a company, a theater production, and a contact.

20. The non-transitory computer-readable storage medium of claim 18, wherein the source node includes a first individual, and the target node includes a second individual.

21. The non-transitory computer-readable storage medium of claim 18, wherein the collaboration data includes at least one of a job title and a school.

* * * * *